Patented Aug. 14, 1945

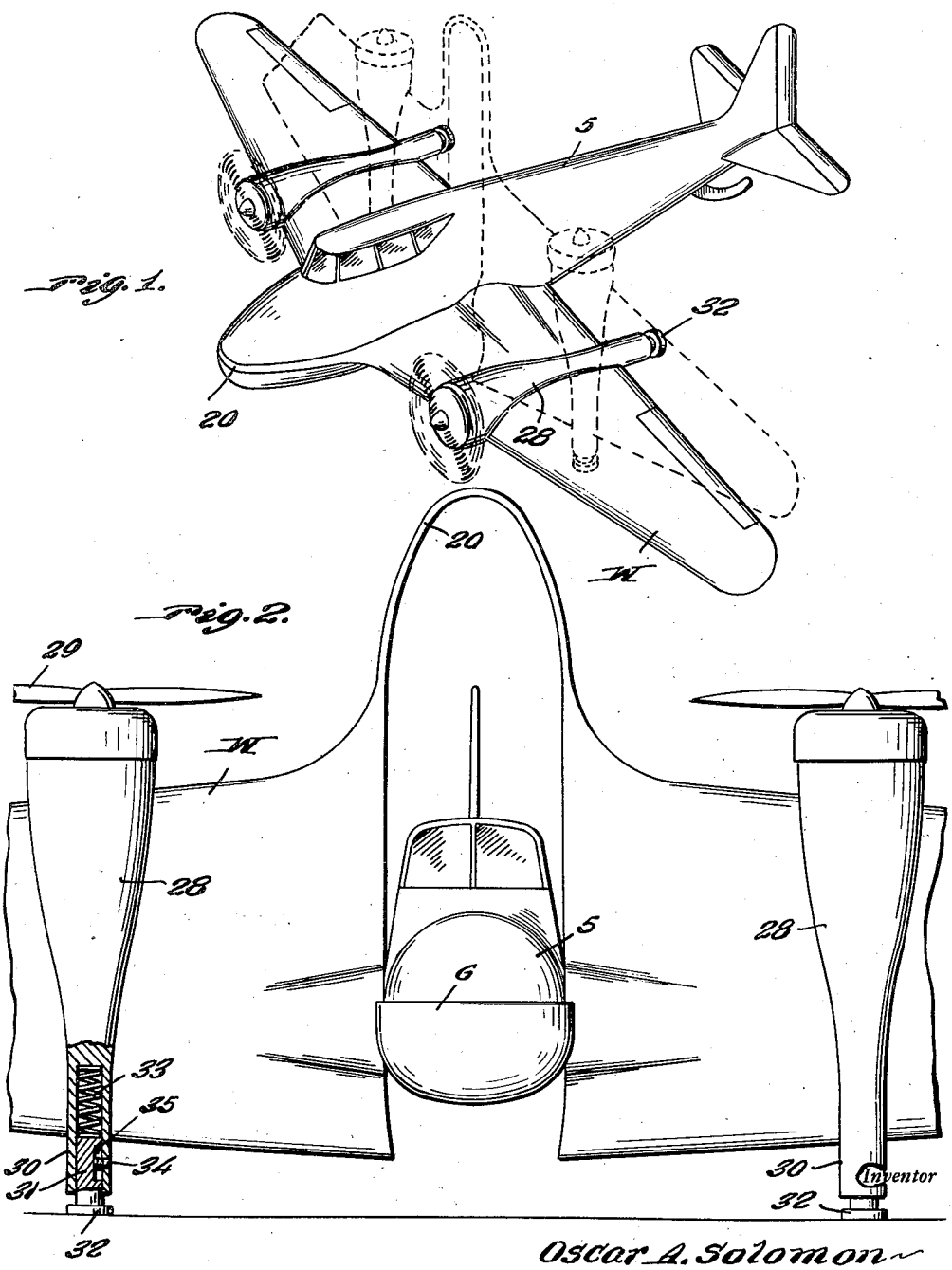

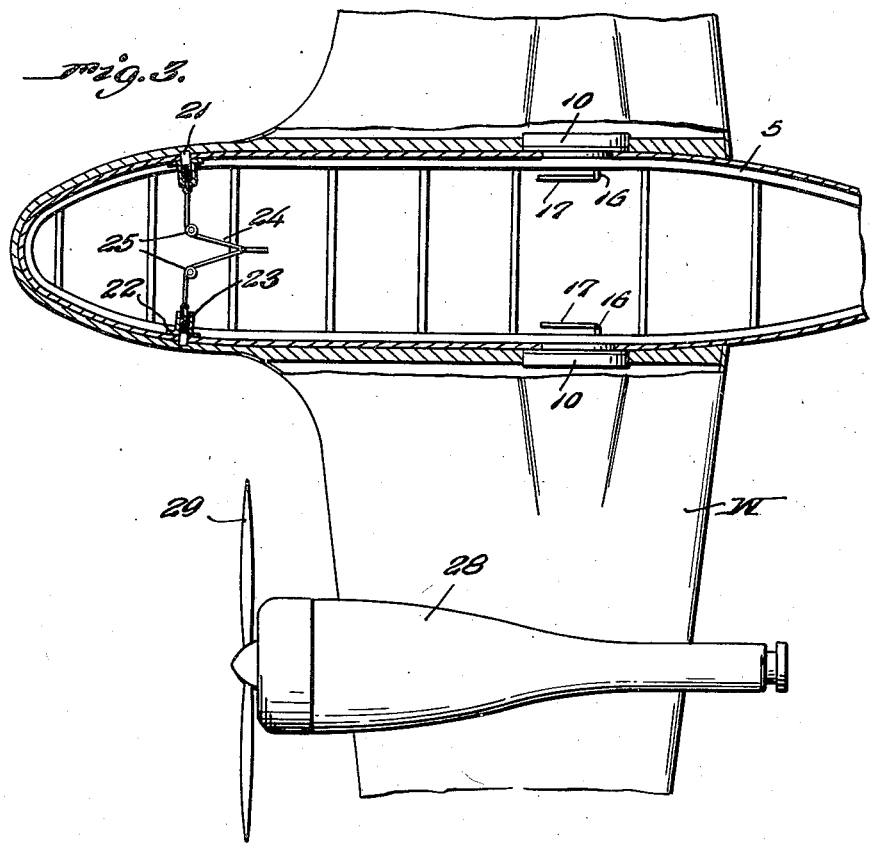
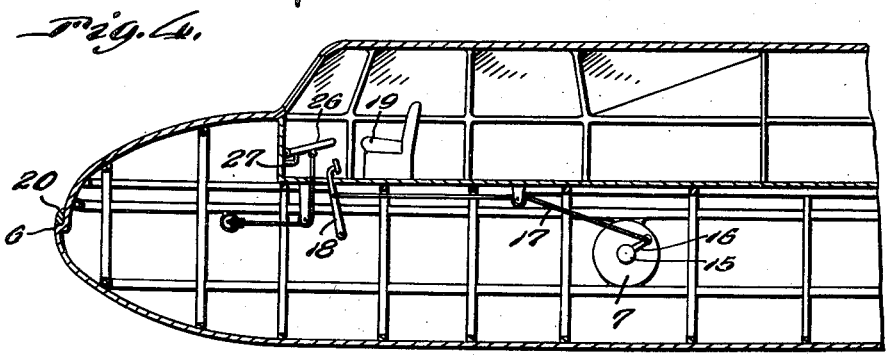
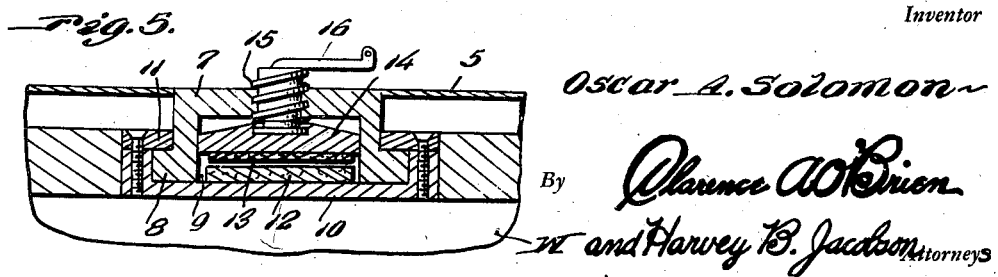

2,382,824

UNITED STATES PATENT OFFICE 2,382,824

AIRPLANE-HELICOPTER

Oscar A. Solomon, North Tonawanda, N. Y.

Application April 24, 1942, Serial No. 440,357

1 Claim. (Cl. 244—7)

The present invention relates to new and useful improvement in airplanes and more particularly to a tiltable wing construction for the airplane in which the motor nacelles are mounted whereby to arrange the motors and wings in a position for use as a helicopter for landing and take-off purposes and also to provide for the positioning of the wings and motor in a normal manner for operating the airplane in a forward direction.

A further object is to provide an airplane of this character of simple and practical construction, which is efficient and reliable in performance, relatively inexpensive to manufacture, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts throughout and in which:

Figure 1 is a perspective view.

Figure 2 is a fragmentary front elevational view showing the wings and motor nacelles in a position for supporting the airplane while at rest.

Figure 3 is a fragmentary top plan view with the fuselage shown in section.

Figure 4 is a fragmentary longitudinal sectional view through the fuselage showing the control means for the tiltable wings, and Figure 5 is a fragmentary sectional view of the pivotal mounting for one of the wings and showing the brake mechanism for securing the wing in a desired adjusted position.

Referring now to the drawings in detail, wherein for the purpose of illustration I have disclosed a preferred embodiment of the invention, the numeral 5 designates the fuselage of an airplane having a shoulder 6 extending horizontally around its nose or front end.

Secured in the opposite sides of the fuselage is a bearing member designated generally at 7 having a flange 8 at its outer end and formed with a recess 9.

A wing W is positioned at each side of the fuselage having its inner end provided with a socket 10 adapted to receive the flanged outer end of the bearing 7 and secured in position therein by a retaining ring 11. Positioned in the socket 10 is a friction disk 12 adapted for engagement by a similar disk 13 formed on a backing plate 14 positioned in the bearing 7, the back of the backing plate being swivelly secured to a screw 15 for moving the backing plate and the friction disk 13 axially in the recess 9 for engaging the friction disk 12.

The screw 15 is threaded in the bearing 7 and is provided with an arm 16 to which a cable 17 is attached leading to a foot pedal 18 adjacent the pilot's seat 19 in the fuselage.

The wings W at the opposite sides of the fuselage are connected by means of a yoke 20 adapted to conform to the construction of the nose of the fuselage and to rest on the shoulder 6 thereof when the wings W are in their normal horizontal position.

The yoke 20 is formed with sockets 21 on the inner edges thereof adapted to receive spring-projected catches 22 mounted in brackets 23 within the fuselage to secure the yoke in position on the shoulder 6 and with the wings in their normal position. The catch 22 is adapted for movement into retracted position to release the yoke and the wings by means of cables 24 extending over pulleys 25 in the fuselage and leading to a lever 26 pivoted to a suitable support 27 in the pilot's cabin.

Mounted in each of the wings is a motor nacelle 28 having the propellers 29 at the front end thereof, the rear ends of the nacelles being formed with a socketed extension 30 projecting beyond the rear edge of the wings and having a plunger 31 slidably mounted therein having a foot 32 at its outer end. A spring 33 in the socket yieldably urges the plunger 31 outwardly. A stop pin 34 is carried by the socket engaging in a slot 35 in the plunger to limit movement of the latter.

In the operation of the device with the wings in the position shown in Figure 2 and the airplane resting on the plungers 31, the propellers will lift the airplane directly upwardly on its take-off and through the manipulation of the rudder and ailerons of the usual airplane construction, the wings will be caused to tilt forwardly into their normal position. The wings may be held in any desired intermediate position between the vertical and horizontal through the use of the friction elements 12 and 13.

When in normal flight the catches 22 secure the wings against tilting movement and when landing the catches are released and through the manipulation of the ailerons the wings may be tilted to adjust the angle of the motors to permit the plane to be set down vertically.

It is believed the details of construction and manner of use of the device will be readily understood from the foregoing without further detailed explanation.

Having thus described the invention what I claim is:

An airplane comprising a fuselage, wings pivotally connected to the fuselage for swinging on a horizontal axis laterally with respect to the fuselage, means securing the wings in a desired position, a yoke connecting the wings for uniform movement, said yoke conforming to the contour of the front end of the fuselage and adapted to fit thereon when the wings are horizontally arranged, and catch means carried by the fuselage releasably engaging the yoke for securing the wings with their surfaces in a horizontal position.

OSCAR A. SOLOMON.